Sept. 24, 1963

B. R. BUDNY 3,105,209

COMPACT CIRCUIT

Filed Nov. 8, 1960

2 Sheets-Sheet 1

INVENTOR

Bernard R. Budny

BY

Arthur H. Seidel

ATTORNEY

Sept. 24, 1963 B. R. BUDNY 3,105,209

COMPACT CIRCUIT

Filed Nov. 8, 1960 2 Sheets-Sheet 2

INVENTOR
Bernard R. Budny

BY
Arthur H. Seidel
ATTORNEY 3,105,209

COMPACT CIRCUIT

Bernard R. Budny, Milwaukee, Wis., assignor to Allen-Bradley Company, Milwaukee, Wis., a corporation of Wisconsin Filed Nov. 8, 1960, Ser. No. 67,938
2 Claims. (Cl. 333—78)

Figure 1:
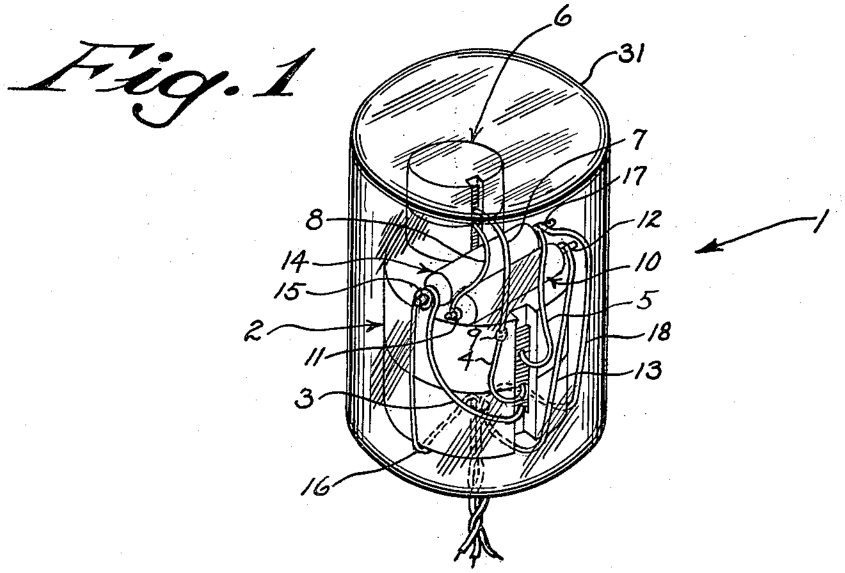

This invention relates to encapsulated circuits of reduced dimension suitable for such purposes as filter circuits and data analyzing apparatus, and it resides more specifically in inductive and capacitive components of small dimension that may be closely assembled without incurring detrimental mutual effects to thereby obtain a compact arrangement permitting use of an extensive number of such circuits within a limited space.

The invention not only provides compactness, but also electrical stability in which the circuit constants will remain within narrow tolerances over a wide temperature range. One form of circuit in which the apparatus of the invention is useful is a filter that passes frequencies over a substantial spectrum with a time delay, but without relative phase shift between the frequencies. For purposes of illustration this particular type of circuit, known as a phase equalizer, will be described in connection with the showing in the drawings and the written specification referring to such drawings.

Temperature variations as spoken of herein are commonly encountered in analyzers and computors where heat evolution of circuit components is a substantial problem because of the confinement of a great number of components within a limited space. Temperature change may vary inductive and capacitive values and in a phase equalizer circuit, for example, unwanted phase shifts between different frequencies must be held at a minimum by selecting inductive and capacitive circuit components that are stable with such temperature change. This requires permeability and dielectric values that in turn are stable with temperature change. In addition, for analyzers and computors it is a requirement that the components be assembled in immediate adjacency to achieve the necessary space conservation. This in turn requires components that are individually self-contained to preclude mutual effects when placed in such compacted assembly. There is described herein a form for a circuit which achieves the foregoing requirements, which form is characterized by enclosed inductors of ferrite that minimize stray magnetic fields in combination with capacitors of a configuration that achieves maximum capacitance in a given volume. It will be found that this construction is particularly ideal for compacted circuit assemblies, such as filters and the like.

It is an object of this invention to provide a circuit having inductance and capacitance that is stable with temperature.

It is another object of this invention to realize a stable filter that delays frequencies over a substantial spectrum without relative phase displacement, so that a complex wave being transmitted will be delayed without distortion.

It is another object of this invention to provide a circuit that has components that may be compacted without encountering undesirable mutual effects.

It is another object of this invention to provide a circuit with low loss components to achieve a constant resistance all pass filter.

The foregoing and other objects and advantages of this invention will appear from the description to follow. In the description reference is made to the accompanying drawings, which form a part hereof, and in which there is shown by way of illustration and not of limitation a specific form in which this invention may be embodied.

Figure 2:
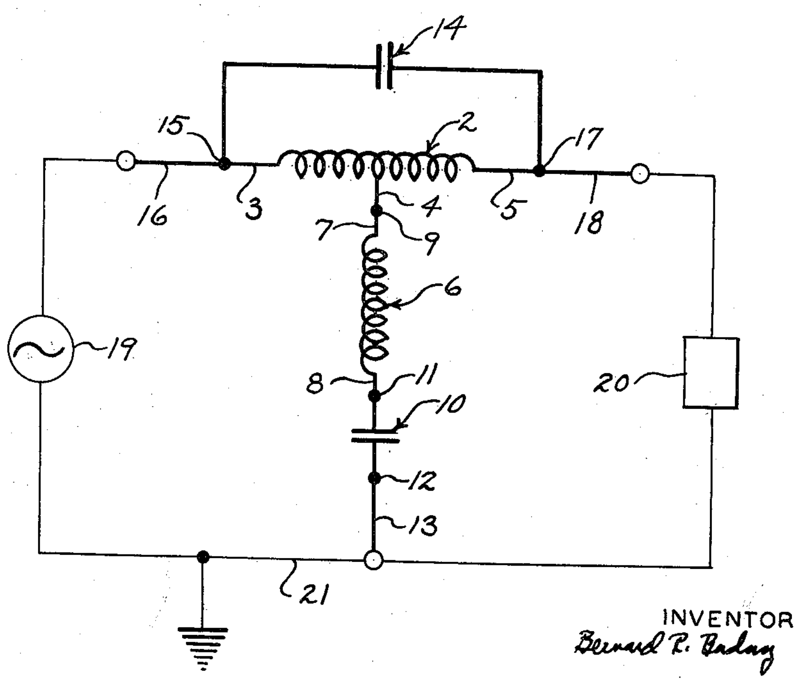
Figure 3:
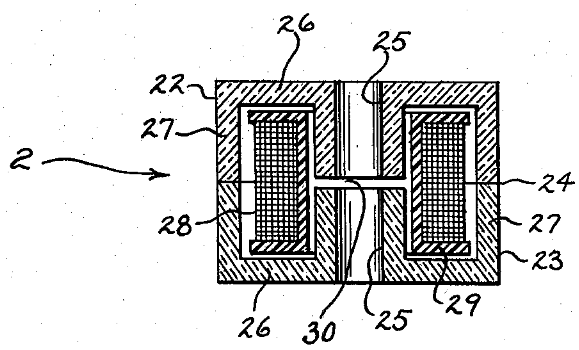
Figure 4:
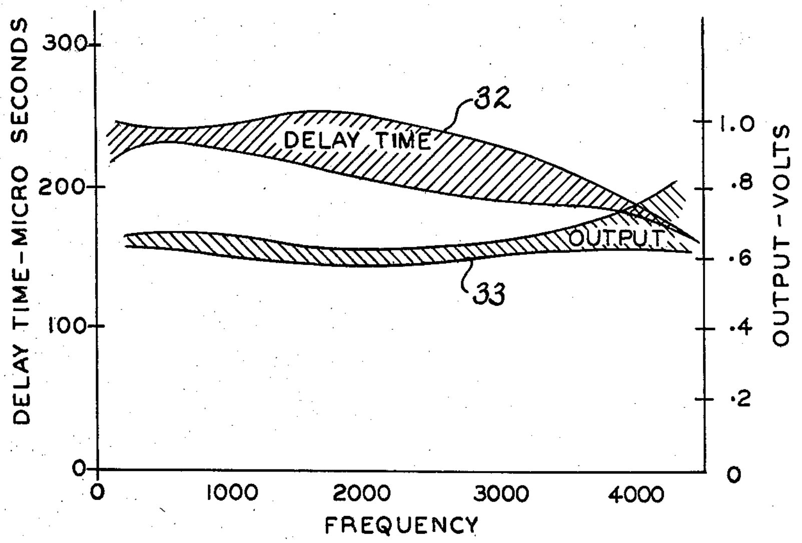

In the drawings:

FIG. 1 is a view in perspective of a form of filter circuit that may embody the invention, FIG. 2 is a schematic wiring diagram of the filter of FIG. 1, FIG. 3 is a view in cross section of an inductor as employed in the filter of FIG. 1, and FIG. 4 is a graph of operating characteristics of the filter of FIG. 1.

Referring now to the drawings, there is shown in FIG. 1 a filter assembly 1 having a series inductor 2 of a circular cylindrical configuration from which a set of three leads 3, 4 and 5 emerge. Disposed upon the upper surface of the series inductor 2 is a smaller branch inductor 6 that is also of a circular cylindrical configuration and from which leads 7 and 8 emerge. The lead 7 is joined to the lead 4 of the inductor 2 at a solder connection 9, and the lead 8 extends to one terminal of a branch capacitor 10 where a solder connection 11 secures the lead 8 in place. The opposite terminal of the branch capacitor 10 is joined by a solder connection 12 to a terminal lead 13 that protrudes from the filter assembly 1 to provide for connection with outside circuit elements.

The branch capacitor 10 is disposed on the top of the series inductor 2 and adjacent the capacitor 10 is a coupling capacitor 14 which is nested between capacitor 10 and branch inductor 6. One end of the coupling capacitor 14 is joined in a solder connection 15 with the lead 3 and a terminal lead 16. The opposite end of the coupling capacitor 14 is connected in a solder connection 17 to the lead 5 and a third terminal lead 18. The terminal leads 16 and 18 protrude from the bottom of the filter assembly 1 similarly as the terminal lead 13, to provide means for connecting the assembly 1 into a circuit for which the filter of FIG. 1 will be a part.

Referring now to FIG. 2, there is shown a wiring diagram of the components described above in connection with FIG. 1. It is seen that a bridged T-type filter circuit is presented in which the series inductor 2 is connected between the terminal leads 16 and 18 so as to be in series with a signal source 19 and a load impedance 20. The lead 4 is shown as a mid-tap for the series inductor 2 from which the branch inductor 6 and branch capacitor 10 form a circuit path providing a by-pass to the ground return 21 between the load impedance 20 and signal source 19. The coupling capacitor 14 is seen to function as a bridging circuit component in parallel relation with the series inductor 2.

The purpose of the particular circuit shown in FIGS. 1 and 2 is to delay signals in their transmission from the signal source 19 to the load impedance 20. Such signals may take the form of a periodic wave with a harmonic content, or pulse wave forms. The delay is to be accomplished without incurring a phase shift between the frequency components of the periodic wave, so that a distortionless delay is achieved. It is essential in a circuit of this nature that each frequency present be delayed equally in time rather than being delayed a certain number of cycles, and the particular circuit as shown in FIG. 2 accomplishes this purpose and a circuit of this form may be termed a phase equalizer or an all-pass constant characteristic resistance filter.

A lattice network could be employed to obtain an equalized time delay as above described, but such a structure would involve additional components together with added connections which would require greater overall bulk. Resort to a T-type filter in place of a lattice network, however, is not a simple transition, since if a simple T with a single element in the cross branch (represented by the inductor 2) is employed, then the circuit branch extending from the mid-tap lead 4 to the return path 21 between the load impedance 20 and signal source 19 would require a theoretical negative inductance. This difficulty is overcome by the addition of the coupling capacitor 14 and the use of both inductance and capacitance in the circuit branch extending downward, as seen in FIG. 2, from the mid-tap lead 4.

The inductors 2 and 6 each take the form of a closed cup and in FIG. 3 there is shown as a representative construction of these components a view in cross section of the inductor 2. The magnetic path for the inductor 2 constitutes a ferrite of the zinc-manganese family, and for the particular circuit shown in the drawings the ferrite had a temperature coefficient of permeability of approximately one tenth percent (.1%) change per degree centigrade over a range of 25 to 125 degrees centigrade. This ferrite is molded in two like halves 22 and 23 which are joined by a thin application of epoxy adhesive 24. Each half 22, 23 has a tubular central stud 25, a flat circular end wall 26, and a cylindrical side wall 27. The magnetic flux path provided by the ferrite is a closed loop comprising the combined central stud 25, one end wall 26, the combined side wall 27, and the other end wall 26. The dimensions for the inductor 2 are selected so that the cross section area of the stud 25 is less than the outer wall 27, so that under conditions of large impressed voltage the stud 25 will magnetically saturate before the side wall 22 or end wall 26 whereby stray magnetic fields will not emanate from the device. In this manner two or more inductors can be placed beside one another without incurring adverse mutual effects.

A coil 28 for the inductor 2 is of fine wire wound on a thin nylon bobbin 29, and as shown in FIG. 1, the leads 3, 4 and 5 emerge from a slotted side of the ferrite. The two facing ends of the studs 25 are ground to present an air gap 30 of a length suitable for obtaining desired inductance. The gap 30 also serves to improve the temperature stability of the inductor 2, by making the effective permeability of the flux path a function of the linear permeability of air as well as of the core material permeability. Hence, while a ferrite with a one-tenth percent temperature coefficient of initial permeability is not as temperature stable as other ferrite materials the introduction of a small air gap enhances the inductor stability so that the temperature coefficient becomes negligible. The air gap also reduces permeability of the magnetic circuit, and inductance calculations are made accordingly.

The capacitors 10 and 14 are shown in FIG. 1 as of a circular cylindrical configuration, and they are constructed of a ceramic dielectric rolled into a spiral. This form of capacitor provides a high capacitance to volume ratio, whereby compactness is achieved. The particular dielectric selected was a barium titanate with a temperature stability of five percent (5%) change in dielectric constant from zero to fifty degrees centigrade. Such a titanate also is of a high dielectric constant to provide relatively large capacitance with volume.

Referring again to FIG. 1, an encapsulating jacket 31 completely embeds the inductors and capacitors to present an outer shell that may take any geometric form desired. This jacket 31 is preferably of a synthetic resin, such as an epoxy, which can be molded or otherwise worked to produce the desired shape. The embedding jacket 31 of FIG. 1 is cylindrical to enhance ease of handling, and to provide a circuit assembly that may readily be disposed in and removed from a receptacle particularly adapted for receiving several like circuits.

The performance that may be achieved from a filter as shown and described in connection with FIGS. 1, 2 and 3 is set forth in the graph of FIG. 4.

The abscissa is calibrated in frequency, the ordinate at the left in micro-seconds of time delay for a signal passing through the filter, and the ordinate at the right in output volts. The "delay time" envelope 32 covers the performance for zero, twenty-six and fifty degrees centigrade, from which it is seen that the delay imposed by the filter is quite uniform over a substantial frequency range, whereby wave distortion will be minimal. The "output" envelope 33 is for tests at like temperatures as for envelope 32 and for like input voltages, from which it is seen that any loss due to the filter is uniform throughout the range of operation, whereby relative dampening and attendant wave distortion due to losses is also minimal.

The foregoing description of a single form of circuit is for illustrative purposes, and is not intended as limiting the scope of the invention. References is made to the following claims for delineating that covered herein and the form, shape and arrangement of parts may be altered without departing from the invention.

I claim:

1. In a circuit assembly the combination comprising: a circular cylindrical inductor of ferrite material having a cylindrical outer wall with flat top and bottom enclosing walls to form an enclosed interior, a central stud that is an integral continuation of said ferrite material extending axially across the interior that is interrupted by an air gap rendering the inductor stable with temperature change and for obtaining desired inductance, and a coil wrapped about the stud from which leads extend to the exterior of the inductor; a second circular cylindrical inductor of ferrite material placed on the flat top of said first circular cylindrical inductor which has a cylindrical outer wall of less diameter than in said first inductor and flat end enclosing walls to form an inclosed interior, a central stud that is an integral continuation of said ferrite material extending axially across the interior that is interrupted by an air gap rendering the inductor stable with temperature change and for obtaining desired inductance, and a coil wrapped about the stud from which leads extend to the exterior of the inductor; a pair of roll type ceramic capacitors placed on the flat top of said first circular cylindrical inductor with terminals extending therefrom; circuit connections joining the inductors and capacitors; and an encapsulating jacket of resinous material surrounding the inductors and capacitors to house them and retain them in assembled position.

2. In a circuit assembly the combination comprising: a group of inductors in which each inductor has a magnetic path of ferrite molded with a central magnetic core and an outer magnetic shielding wall that is of greater cross section than the core to form a magnetic loop flux path for the inductor in which the core will saturate before the shielding wall, said core having a gap reducing the permeability of the path and enhancing temperature stability of the inductor, and a coil wound about the core which is within the shielding wall; at least one capacitor having a temperature stable titanate dielectric in roll form; said inductors and capacitors being disposed immediately adjacent one another for confined assembly within a minimal space with one inductor supporting the other elements and presenting the maximum cross section dimension had from the grouping of said elements; and an embedding epoxy resin surrounding the foregoing elements to enclose the same in a capsule of a cylindrical configuration adapted for ready handling.

References Cited in the file of this patent

UNITED STATES PATENTS

| | | |
|---|---|---|
| 1,059,120 | Cotton | Apr. 15, 1913 |
| 1,803,868 | Porter | May 5, 1931 |
| 1,874,242 | Christopher | Aug. 30, 1932 |
| 2,422,303 | Jacob | June 17, 1947 |
| 2,552,999 | Pannell et al. | May 15, 1951 |
| 2,590,821 | Kiser | Mar. 25, 1952 |
| 2,718,622 | Harkless | Sept. 20, 1955 |
| 2,728,054 | Albers-Schoenberg | Dec. 20, 1955 |
| 2,855,571 | Kleespies | Oct. 7, 1958 |
| 2,918,633 | Schenker et al. | Dec. 22, 1959 |
| 2,918,635 | Schenker | Dec. 22, 1959 |
| 2,939,095 | Chertok | May 31, 1960 |

OTHER REFERENCES

Bryan: Radio and Television News, December 1950, pages 6A, 7A, 8A, and 27A.